(12) United States Patent
Wei et al.

(10) Patent No.: US 9,054,599 B2
(45) Date of Patent: Jun. 9, 2015

(54) POWER CONVERTER AND INTEGRATED DC CHOKE THEREFOR

(75) Inventors: Lixiang Wei, Whitefish Bay, WI (US); Yuan Xiao, Kitchener (CA); Navid Zargari, Cambridge (CA); Richard Lukaszewski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 73 days.

(21) Appl. No.: 13/421,509

(22) Filed: Mar. 15, 2012

(65) Prior Publication Data

US 2013/0242623 A1    Sep. 19, 2013

(51) Int. Cl.
*H02J 1/10* (2006.01)
*H02M 5/458* (2006.01)

(52) U.S. Cl.
CPC ................................... *H02M 5/458* (2013.01)

(58) Field of Classification Search
CPC ........................................................ H02M 1/10
USPC ........... 363/65, 34–37, 67, 69, 71, 51, 58, 70; 318/798, 799, 801, 803
See application file for complete search history.

(56) References Cited

U.S. PATENT DOCUMENTS

| | | | |
|---|---|---|---|
| 4,134,055 A | 1/1979 | Akamatsu | |
| 4,910,482 A | 3/1990 | Takagai et al. | |
| 5,050,059 A * | 9/1991 | Neeser et al. | 363/65 |
| 5,083,101 A | 1/1992 | Frederick | |
| 5,155,676 A | 10/1992 | Spreen | |
| 5,313,176 A | 5/1994 | Upadhyay | |
| 5,319,343 A | 6/1994 | Jeffries | |
| 5,321,373 A | 6/1994 | Shusterman et al. | |
| 5,422,619 A | 6/1995 | Yamaguchi et al. | |
| 5,581,224 A | 12/1996 | Yamaguchi | |
| 5,686,806 A | 11/1997 | Hibbard | |
| 5,731,666 A | 3/1998 | Folker et al. | |
| 5,905,642 A | 5/1999 | Hammond | |
| 5,990,654 A | 11/1999 | Skibinski et al. | |
| 6,617,814 B1 | 9/2003 | Wu et al. | |
| 6,617,950 B2 | 9/2003 | Gilmore et al. | |
| 6,642,672 B2 | 11/2003 | Hu et al. | |
| 6,744,643 B2 * | 6/2004 | Luo et al. | 363/24 |
| 6,768,408 B2 | 7/2004 | Gilmore et al. | |
| 6,819,070 B2 | 11/2004 | Kerkman et al. | |
| 6,917,271 B2 | 7/2005 | Zhang et al. | |

(Continued)

FOREIGN PATENT DOCUMENTS

| | | |
|---|---|---|
| AU | 2006201301 A1 | 11/2006 |
| CA | 2541211 A1 | 11/2006 |
| WO | WO2009131602 A1 | 10/2009 |

OTHER PUBLICATIONS

Dudi A. Rendusara, E. Cengelci, Prasad N. Enjeti, Victor R Stefanovic, James W. Gray, "Analysis of common mode voltage-"Neutral Shift" in medium voltage PMW adjustable speed drive (MV-ASD) systems", 2000 IEEE.

(Continued)

*Primary Examiner* — Matthew Nguyen
*Assistant Examiner* — Trinh Dang
(74) *Attorney, Agent, or Firm* — Fay Sharpe LLP

(57) ABSTRACT

A power conversion system with multiple parallel connected motor drives including a plurality of rectifiers and a corresponding inverters connected by windings of a single common mode choke.

20 Claims, 5 Drawing Sheets

(56) References Cited

U.S. PATENT DOCUMENTS

| | | |
|---|---|---|
| 7,034,501 B1 | 4/2006 | Thunes et al. |
| 7,106,025 B1 | 9/2006 | Yin et al. |
| 7,132,812 B1 | 11/2006 | Wu et al. |
| 7,142,081 B1 | 11/2006 | Shudarek |
| 7,164,254 B2 | 1/2007 | Kerkman et al. |
| 7,274,576 B1 | 9/2007 | Zargari et al. |
| 7,535,125 B2 | 5/2009 | Shudarek |
| 7,623,016 B2 | 11/2009 | Shudarek et al. |
| 2004/0135661 A1 | 7/2004 | Haugs et al. |
| 2006/0061325 A1 | 3/2006 | Tang et al. |
| 2006/0152324 A1 | 7/2006 | Haugs et al. |
| 2006/0250207 A1 | 11/2006 | Shudarek |
| 2007/0115087 A1 | 5/2007 | Lee et al. |
| 2008/0074227 A1 | 3/2008 | Chen et al. |
| 2008/0116770 A1* | 5/2008 | Lewis .................... 310/68 D |
| 2009/0003020 A1* | 1/2009 | Zhang et al. .................... 363/65 |
| 2009/0256419 A1 | 10/2009 | Anghel et al. |
| 2009/0261939 A1 | 10/2009 | Shudarek |
| 2009/0322081 A1 | 12/2009 | Wagoner et al. |
| 2009/0322082 A1 | 12/2009 | Wagoner et al. |
| 2010/0079230 A1* | 4/2010 | Brubaker et al. ............. 336/196 |
| 2012/0013372 A1* | 1/2012 | Campbell et al. ............. 327/141 |

OTHER PUBLICATIONS

Tamas Kerekes, Remus Teodorescu, Marco Liserre, Christian Klumpner and Mark Sumner, "Evaluation of three-phase transformerless phovoltaic inverter topologies", 2009 IEEE.

Robert M. Cuzner, Daniel J. Nowak, Ahish Bendre, Giovanna Oriti and Alexander L. Julian, Mitigating circulating common-mode currents between parallel soft-switched drive systems; 2007 IEEE.

Hirofumi Akagi and Takafumi Doumoto, "An approach to eliminating high frequency shaft voltage and ground leakage current from an inverter-driven motor", 2004 IEEE.

Juergen K. Steinke, "Use of an LC filter to achieve a motor-friendly performance of the PWM voltage source inverter", 1997 IEEE.

* cited by examiner

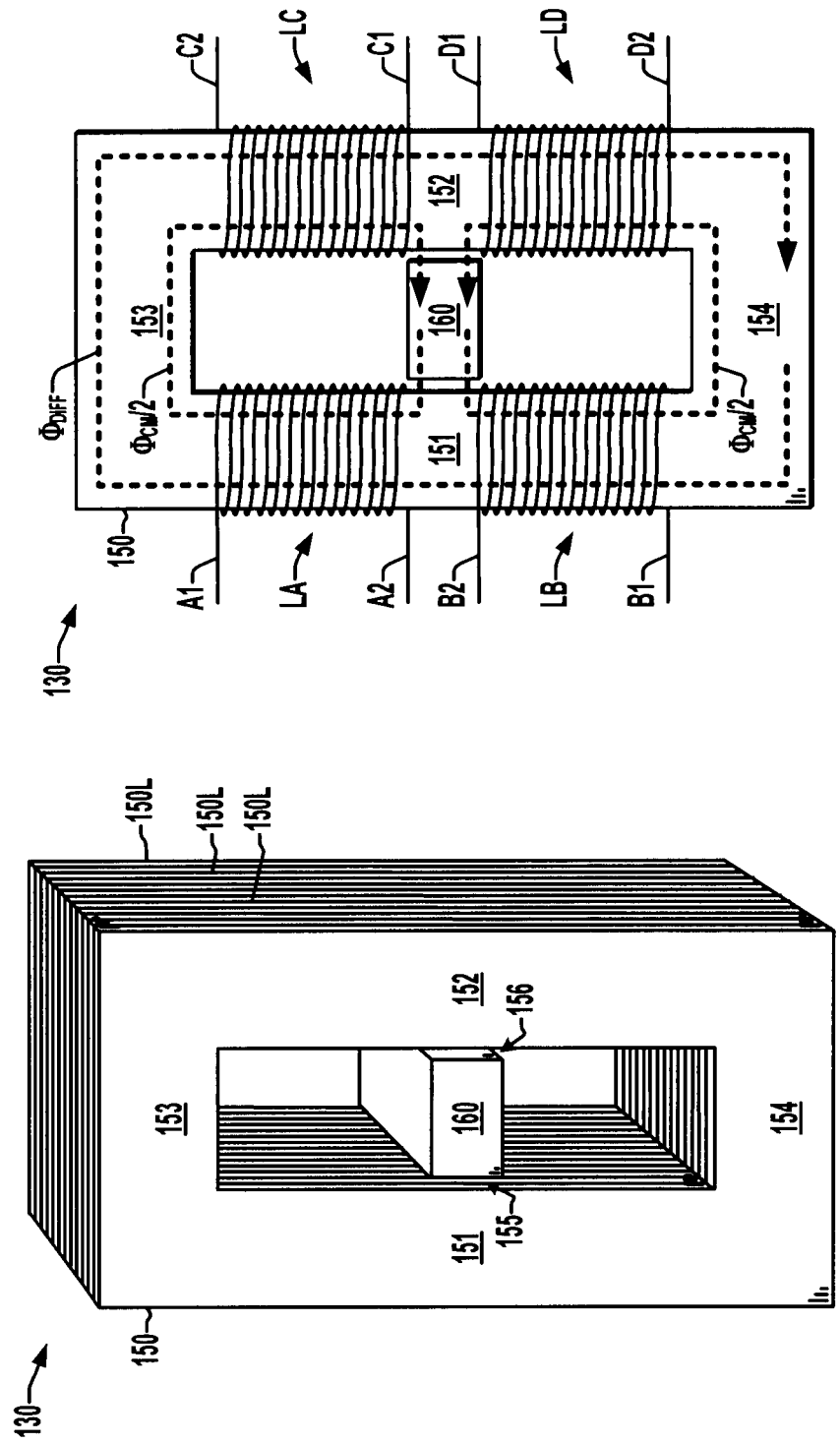

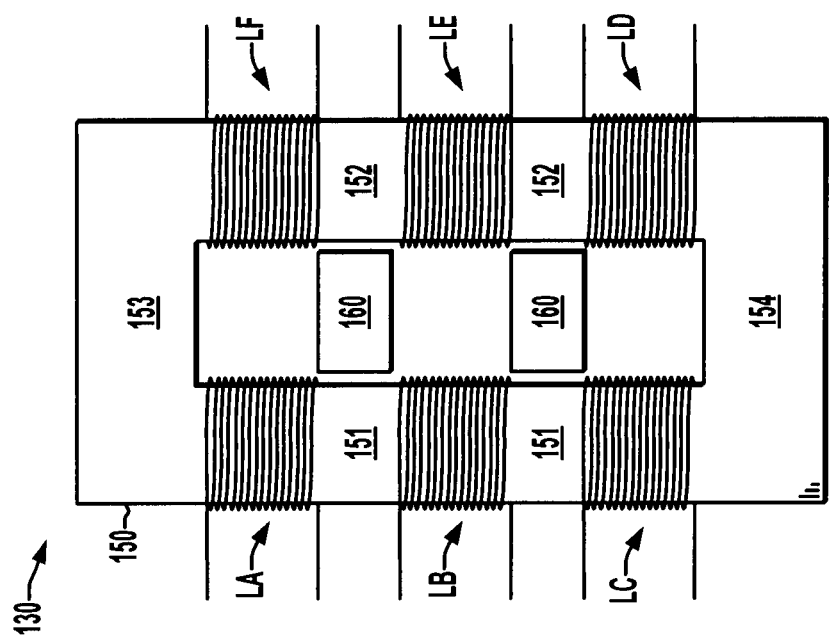

POWER CONVERTER AND INTEGRATED DC CHOKE THEREFOR

BACKGROUND

Power conversion systems such as motor drives typically receive AC input power which is converted to an internal DC for subsequent conversion to AC output power for driving a motor or other load. Current source converter type motor drives include a rectifier which converts input AC power from a single or multiphase AC input source to provide DC current to a DC link circuit. An inverter converts the DC link current into single or multiphase AC output power to drive a motor load. Such power conversion systems may be subject to both differential and common mode voltages and currents, which can cause a variety of problems including degradation of the power conversion system and/or the motor load. For instance, motors are susceptible to damage or performance degradation caused by appearance of excessive common mode voltages on the motor leads. Many medium voltage motor drives employ active front end (AFE) rectifiers in order to minimize line-side harmonics using special rectifier switching patterns, as well as a DC link inductor or choke to control common-mode voltage stresses harmful to motor winding insulation. These techniques advantageously mitigate the need for input and/or output transformers resulting in virtually no voltage stress on the motor windings, even if connected through long cables, while saving overall installation cost, size and weight. Thus, medium voltage drives have become a preferred choice over low-voltage drives that typically do not provide active front end switching and therefor require transformers. The benefits of the transformerless operation are also desired in situations where increased drive capability is needed.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

The present disclosure provides power conversion apparatus and techniques by which the benefits of the transformerless motor drive technology can be applied to situations in which increased drive capability is desired, while controlling and mitigating common mode voltage stresses to a motor or other type of AC load. In addition, the disclosed techniques advantageously reduce the size, weight and cost for a single power conversion system compared with parallel connection of separate motor drives or power converters.

A power conversion system is provided which includes two or more rectifiers and corresponding inverters with the rectifier inputs coupled with one another and with the inverter outputs coupled with one another. A single choke is provided, including one or more coils coupled between the first rectifier DC output in the first rectifier DC input, as well as one or more further coils coupled between the second rectifier DC output and the second inverter DC input. In certain embodiments, the rectifiers, the inverters, and the single choke are located within a single housing. In certain embodiments, moreover, the choke includes a first pair of coils coupled between the first rectifier DC output in the first inverter DC input, as well as a second pair of coils coupled between the second rectifier DC output in the second inverter DC input. The rectifiers in certain embodiments include switching devices coupled between the AC inputs and the DC output nodes, and one or more controllers provide synchronized switching control signals to the devices of the first and second rectifiers. In certain embodiments, moreover, the switching control signals for the first and second rectifiers are phase shifted with respect to one another.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 3 is a front perspective view illustrating a laminated DC link choke core structure with a single shunt extending between the vertical core legs for the common mode choke of FIGS. 1 and 2;

FIG. 4 is a simplified front elevation view illustrating an exemplary DC link choke with first, second, third, and fourth windings located on the vertical core legs and the corresponding connections in the parallel current source motor drive of FIG. 2;

FIG. 6 is a simplified front elevation view illustrating another exemplary DC link choke with six windings for use in the parallel current source motor drive of FIG. 5.

DETAILED DESCRIPTION

Figure 1:
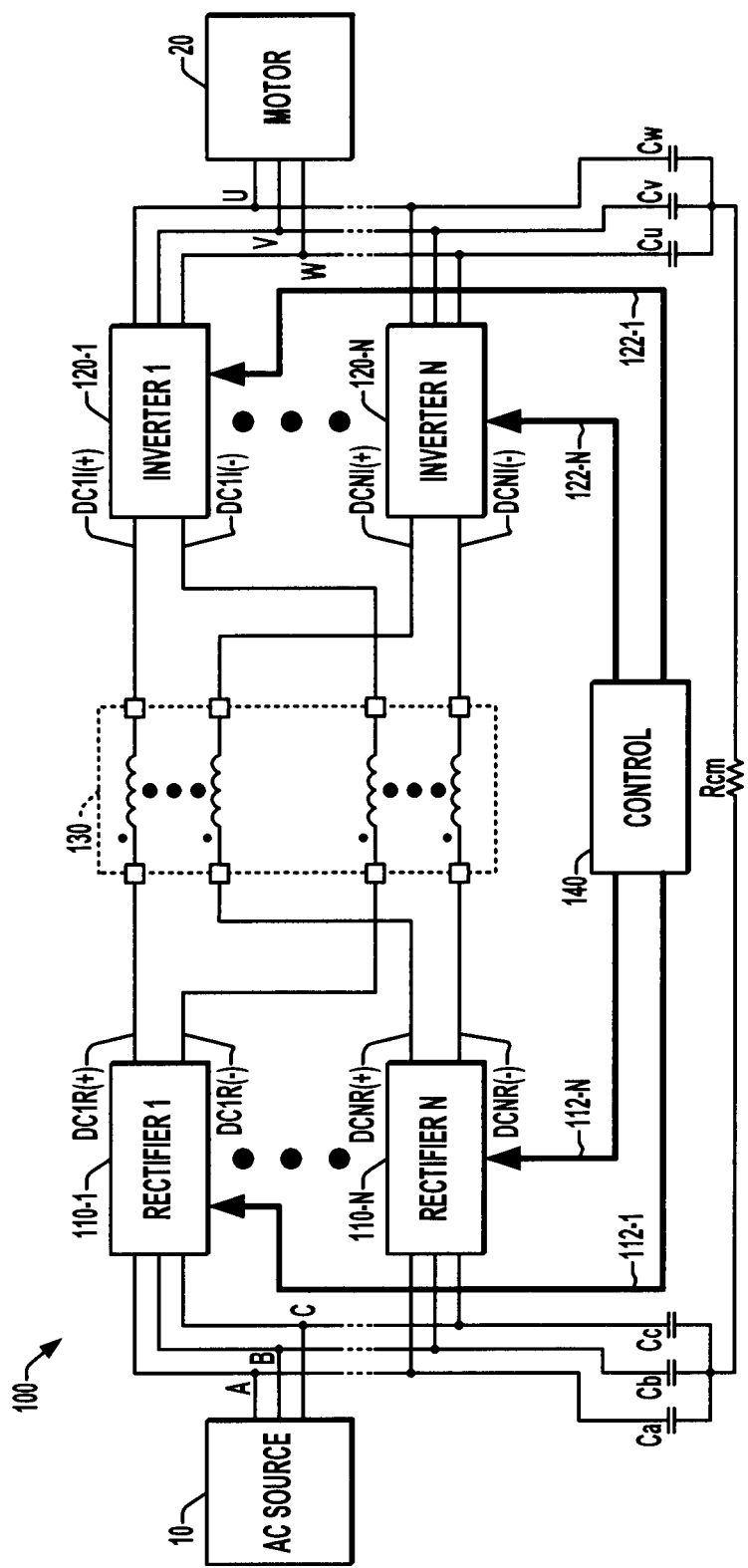
FIG. 1 is a schematic diagram illustrating a parallel current source motor drive with a plurality of rectifiers and inverters coupled with a single common mode choke in accordance with one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale.

Parallel power converters are provided which utilize a single common mode choke to mitigate common mode voltage stresses to motors or other loads. Although illustrated and described hereinafter in the context of motor drive type power converters, the various concepts of the present disclosure find utility in association with other forms of power conversion systems that drive any type of AC load using multiple rectifiers and corresponding inverters with a shared DC link choke.

FIG. 1 illustrates an exemplary current source motor drive type power conversion system (motor drive) 100 receiving single or multiphase AC input power from an AC source 10 (three-phase in the illustrated example) and providing single or multiphase AC output power to a load, such as a three-phase motor 20 shown in figure. In order to provide increased drive capability, the motor drive 100 includes an integer number "N" corresponding sets of rectifiers 110-1 through 110-N and inverters 120-1 through 120-N, where N is a positive integer greater than 1. The rectifiers 110 may be passive or active or combinations thereof, and each rectifier 110 includes a rectifier input for receiving AC electrical input power from the AC source 10 as well as a rectifier DC output with first and second DC output nodes (DC+, DC−) and internal circuit components to convert the received AC electrical input power to provide DC output power at the rectifier DC output nodes. In addition, as seen in FIG. 1, the rectifier inputs of all the rectifiers 110 are coupled with one another and with the power phases A, B and C of the AC source 10. The drive 100 may also include input filter circuitry, for example, input filter capacitors Ca, Cb, and Cc individually coupled between a corresponding AC input line A, B, or C and a common input neutral, although not a strict requirement of the present disclosure.

The DC outputs of the rectifiers 110 are not coupled with one another in the illustrated embodiment, but instead are connected through corresponding coils of a single common mode choke 130 to a corresponding set of DC input terminals of a corresponding inverter 120. As seen in FIG. 1, for example, the positive DC output DC1R(+) from the first rectifier 110-1 is connected through a coil of the single choke 130 to the positive inverter DC input DC1I(+) of the corresponding first inverter 120-1, and likewise the negative DC output DC1R(−) of the first rectifier 110-1 is connected through another coil of the choke 130 to the negative DC input DC1I(−) of the first inverter 120-1. The same is true for the remaining rectifier/inverter pairs, with the positive DC output DCNR(+) from the nth rectifier 110-N being connected through a choke coil to the positive DC input DCNI(+) of the nth inverter 120-N, and with the negative DC output DCNR(−) of the rectifier 110-N connected through another choke coil to the negative DC input DCNI(−) of the nth inverter 120-N.

In the configuration of FIG. 1, a separate coil of the single choke 130 is provided in the path between both the positive rectifier output and a corresponding positive inverter input as well is between the negative rectifier output and the corresponding negative inverter input. Other embodiments are possible in which a coil is provided in only one of the two (positive/negative) DC connections between a corresponding rectifier 110 and inverter 120. In addition, further embodiments are possible in which multiple coils of the single common mode choke 130 are connected between a given rectifier DC output terminal and a corresponding inverter DC input terminal. In the embodiment of FIG. 1, moreover, each rectifier/inverter pair 110/120 establishes a separate DC link with positive and negative DC nodes, at least one of which includes a series connected coil of the choke 130. Other embodiments are possible in which two rectifier/inverter pairs share a common DC link with positive and negative DC nodes, with at least two such exclusive or shared DC links provided within the motor drive 100 and having at least one series connected coil of the single common mode choke 130 disposed in one or both paths of the corresponding DC link.

The inverters 120 each include an inverter DC input with first and second DC input nodes (DC+, DC−), along with an inverter AC output coupled to the motor load 20, where the AC outputs of the inverters 120 are coupled with one another. In this manner, the drive capability of the overall power conversion system 100 for driving a motor load 20 is the sum of the output drive capabilities of multiple inverters 120. The motor drive 100 may also include one or more output filter circuits. For example, the drive 100 in FIG. 1 includes filter capacitors Cu, Cv, and Cw coupled between the corresponding AC input lines U, V, and W and a common output neutral. In addition, a common mode resistance Rcm is provided connecting the input and output neutrals of the drive 100, although not a strict requirement of the various concepts of the present disclosure.

The drive 100 also includes one or more controllers 140, such as control boards, for operating the rectifiers 110 and inverters 120 to selectively convert input AC electrical power into two or more intermediate DC links conducting DC current, and thereafter to convert the DC link currents into output AC power for driving a motor load 20. In the case of active front end implementations, the controller 140 provides sets of rectifier switching control signals 112-1 through 112-N to the corresponding rectifiers 110-1 through 110-N for AC-DC conversion, and also provides sets of inverter switching control signals 122-1 through 122-N to the inverters 120-1 through 120-N. The controller 140 can be any suitable hardware, processor-executed software, programmable logic, circuitry, or combinations thereof which is programmed and/or configured to perform normal power conversion operation of the drive 100 according to one or more desired operating conditions or setpoint signals/values (not shown), such as desired motor speed, position, torque or combinations thereof. In one possible embodiment, the controller 140 may be implemented in a single processor-based converter control board which operates the switching operation of the active front end rectifiers 110 as well as the inverters 120, although separate control boards can alternatively be used.

Figure 2:
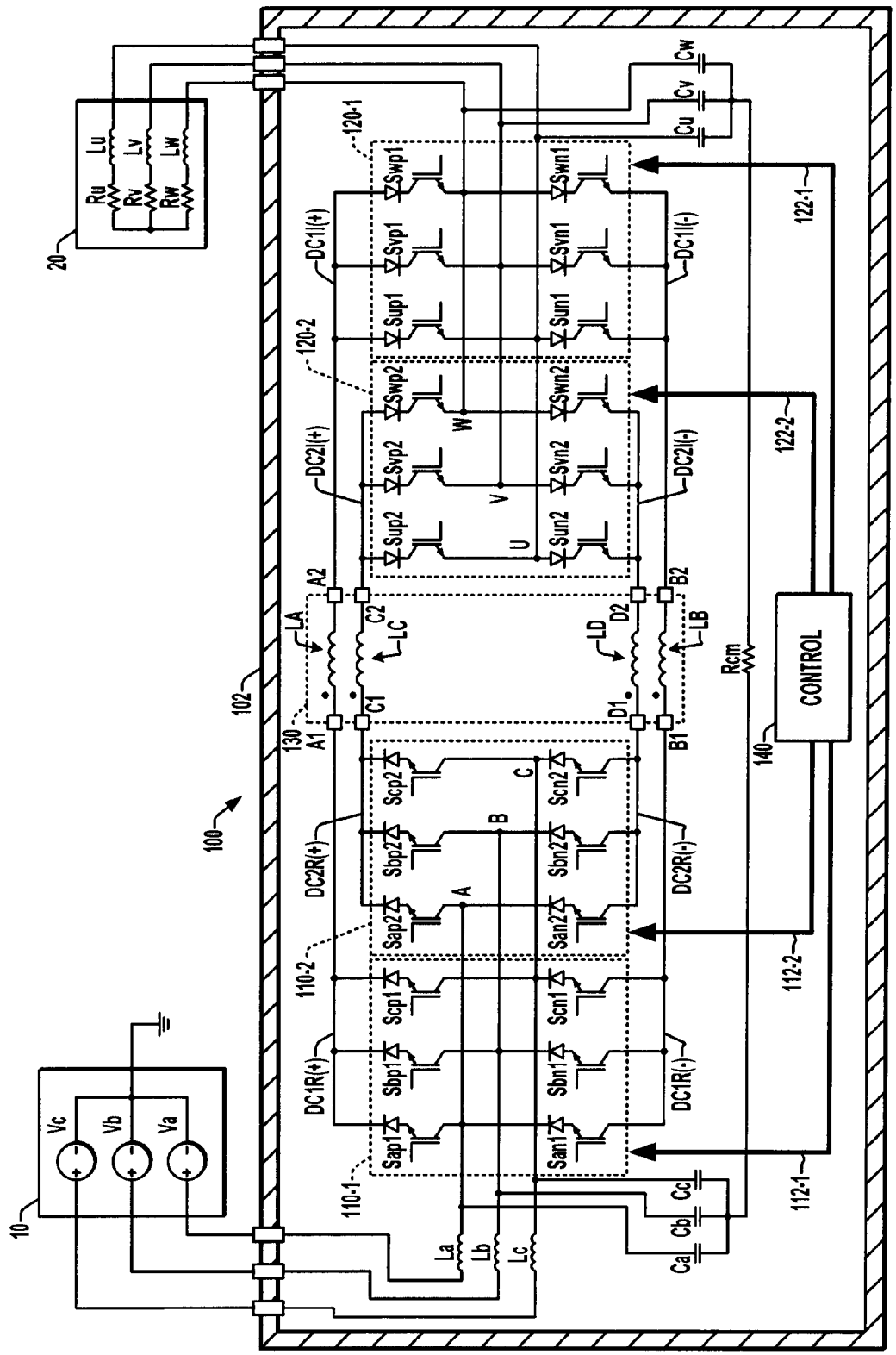
FIG. 2 is a detailed schematic diagram illustrating an exemplary parallel current source motor drive with two rectifiers and two inverters coupled with a common mode choke having four windings in accordance with the disclosure.

Referring also to FIGS. 2-4, FIG. 2 illustrates an exemplary parallel current source motor drive embodiment 100 with two rectifiers 110-1 and 110-2 as well as two inverters 120-1 and 120-2 coupled with a shared single common mode choke 130 having four windings LA-LD in accordance with the disclosure. The motor drive 100 in FIG. 2 includes the rectifiers 110-1 and 110-2, as well as the inverters 120-1 and 120-2 and the shared choke 130 in a single enclosure or housing 102, such as a metal cabinet or other suitable structure for housing these components along with other associated circuitry including input and output filter components (Ca, Cb, Cc Cu, Cv, and Cw described above as well as AC line reactors La, Lb and Lc as seen in FIG. 2), common mode resistor Rcm, one or more control boards 140 and associated switch driver circuits, one or more blowers or cooling fans (not shown), optional user interface and communication connections (not shown), etc. The enclosure 102 provides input power connection terminals for connection with an AC input source 10 providing a three-phase power to the drive 100 as phase voltages Va, Vb and Vc at typical line frequency (e.g., 50 Hz or 60 Hz) with the input phase voltages shifted 120° relative to one another. Output terminals are also provided for connection of the inverter output lines U, V and W with a three-phase motor load 20 having line impedances represented as a phase resistance in series with a phase inductance Ru and Lu, Rv and Lv, Rw and Lw.

The rectifiers 110 may be passive rectifier circuits, including one or more passive diodes for rectifying AC input power to provide DC output power. In other implementations as shown in FIG. 2, active rectifiers 110 may be used, including a plurality of switches (e.g., SGCTs, IGCTs, GTOs, thyristors, IGBTs with reverse blocking capability, etc.) operable according to corresponding control signals 112 from the controller 140 for selectively creating an intermediate DC link current. The inverters 120 receive DC link current via the input nodes DCI(+) and DCI(−), which are connected to an array of inverter switching devices (e.g., SGCTs, IGCTs, GTOs, thyristors, IGBTs, etc.), and which are selectively operated according to corresponding switching control signals 122 from the controller 140 to selectively couple individual ones of the three-phase output lines U, V and W with one of the DC input nodes DCI(+) and DCI(−) according to any suitable switching control technique (e.g., such as space vector modulation (SVM), etc.). By this operation, the DC link current received at the inverters 120 by way of the link choke 130 is selectively converted into multiphase AC output currents to drive the motor load 20.

FIGS. 3 and 4 illustrate an exemplary shared DC link choke 130, which can be constructed in certain embodiments as illustrated and described in U.S. patent application Ser. No. 13/177,100, filed Jul. 6, 2011, entitled "Power Converter and Integrated DC Choke Therefor", and assigned to the Assignee of the present disclosure, which is incorporated herein by reference in its entirety. The choke 130 in FIGS. 3 and 4 is constructed with four coils LA-LD for use in a dual rectifier/inverter drive 100 as shown in FIG. 2. The choke 130 includes a first pair of coils LA, LB coupled between the rectifier DC output DC1R(+), DC1R(−) of the first rectifier 110-1 and the inverter DC input DC1I(+), DC1I(−) of the first inverter 120-1. The first pair of coils includes a first coil LA coupled between the first DC output node DC1R(+) of the first rectifier 110-1 and the first DC input node DC1I(+) of the first inverter 120-1, as well as a second coil LB coupled between the second DC output node DC1R(−) of the first rectifier 110-1 and the second DC input node DC1I(−) of the first inverter 120-1. As best seen in FIGS. 2 and 4, the choke 130 further provides a second pair of coils LC, LD including a third coil LC coupled between the first DC output node DC2R(+) of the second rectifier 110-2 and the first DC input node DC2I(+) of the second inverter 120-2, and a fourth coil LD coupled between the second DC output node DC2R(−) of the second rectifier 110-2 and the second DC input node DC2I(−) of the second inverter 120-2.

Any suitable choke structure may be used which provides at least one coil coupled between the output of the first rectifier 110-1 and the input of the first inverter 120-1 and one or more further coils coupled between the DC output of the second rectifier 110-2 and the DC input of the second inverter 120-2. The choke 130 is preferable constructed using a single core structure made of any suitable material, such as ferrous or magnetic material or magnetizable material, or an air core choke configuration may be used.

In the embodiment of FIGS. 2-4, the first coil pair LA, LB of the shared choke 130 forms an intermediate circuit that links the switches Sap1, San1, Sbp1, Sbn1, Scp1 and Scn1 of the first rectifier 110-1 via the first and second DC output nodes DC1R(+) and DC1R(−) with the DC input nodes DC1I (+), DC1I(−) and the switches Sup1, Sun1, Svp1, Svn1, Swp1 and Swn1 of the first inverter 120-1. The second pair of choke coils LC, LD forms a separate DC link via nodes DC2R(+), DC2R(−), DC2I(+) and DC2I(−) between the switches Sap2, San2, Sbp2, Sbn2, Scp2 and Scn2 of the second rectifier 110-2 and the switches Sup2, Sun2, Svp2, Svn2, Swp2 and Swn2 of the second inverter 120-2.

As best seen in FIGS. 3 and 4, the exemplary DC choke 130 is constructed using a core structure 150, which can be fabricated using any suitable inductor or transformer core material. As shown in FIG. 3, moreover, the core structure 150 in certain embodiments is constructed using two or more laminates 150L, which can be coated or uncoated and can be held together as a single core structure using any suitable techniques. The core structure 150 includes first and second vertical legs 151 and 152, respectively, each with an upper first end and a lower second end. The choke core 150 also includes a horizontally disposed third leg 153 extending between the upper ends of the first and second legs 151 and 152, and a horizontal fourth leg 154 extending between the lower ends of the first and second legs 151 and 152. In certain embodiments, the core structure 150 may be replicated as two or more laminates 150L as shown in FIG. 3, or a single unitary structure 150 may be provided. In addition, the exemplary core structure 150 has no gaps in or between the legs 151-154, although other embodiments are possible in which an air gap (or gap filled with other material) is provided in or between some or all of the legs 151-154 or in which multiple air gaps are provided (not shown).

As seen in FIGS. 3 and 4, moreover, one or more shunts 160 may be included in the link choke 130 to provide a magnetic flux path between intermediate portions of the vertical legs 151 and 152. The shunt or shunts 160 may be constructed of any suitable material such as the same core material used to make the core structure 150. In the example of FIG. 2, a single shunt 160 is disposed between the intermediate portions of the legs 151 and 152, where the shunt 160 is spaced from the legs 151 and 152, thereby defining first and second gaps 155 and 156, respectively. In certain embodiments, the gaps 155 and 156 may be equal, or these gaps 155, 156 may be different. Moreover, in certain examples, one of the gaps 155, 156 may be zero, with the corresponding end of the shunt 160 contacting the corresponding leg 151, 152 of the core structure 150. In various embodiments, more than one shunt 160 may be used.

As best seen in FIGS. 2 and 4, the choke 130 (for the case in which a single shunt 160 is used) includes four exemplary windings LA, LB, LC and LD provided on the first and second legs 151, 152, each of which forms a coil L coupled between a rectifier DC output and an inverter DC input. The first winding LA includes a first terminal A1 and a second terminal A2 and forms one or more turns around the first leg 151 between the intermediate portion thereof and the upper end of the leg 151, where the beginning of the winding LA starting from the first terminal A1 crosses in front of the upper portion of the first leg 151 and the turns continue downward with the final portion of the winding LA crossing behind the leg 151 and ending at the second terminal A2. In this manner, differential current flowing into the first terminal A1 and out of the second terminal A2 will cause upward flux $\Phi_{DIFF}$ within the upper portion of the first leg 151 shown in FIG. 4. The second winding LB has a first terminal B1 and a second terminal B2 and forms at least one turn around the first leg 151 between the intermediate portion and the lower end of the first leg 151. The beginning of the second winding LB starting from the terminal B1 passes behind the first leg 151 and the winding turns proceed upward to a final portion passing in front of the leg 151 and ending at the second terminal B2. Thus, DC return current flowing from the inverter 120-1 into the terminal B2 and out of the terminal B1 to the rectifier 110-1 will contribute to the differential flux $\Phi_{DIFF}$ in the upward direction in the lower part of the first leg 151.

The third and fourth windings LC and LD are wound around the second core leg 152, with the third winding LC including terminals C1 and C2 and at least one turn around the second leg 152 between the intermediate portion thereof and the upper end of the second leg 152. The third coil winding LC begins at the terminal C1 and passes in front of the leg 152, extending upward, with the final portion of the winding LC passing behind the leg 152 and ending with the second terminal C2. Thus, current flowing into the first terminal C1 and out of the second terminal C2 will contribute to the differential flux $\Phi_{DIFF}$ in the downward direction in the upper portion of the second leg 152. Also, the fourth winding LD has terminals D1 and D2, with the beginning of the winding LD passing from the first terminal D1 behind the leg 152 and extending downward toward the lower end of the leg 152 with the final portion of the winding LD passing in front of the leg 152 and ending at the second terminal D2. In this configuration, return current flowing into the second terminal D2 and out of the first terminal D1 contributes to the downward differential flux $\Phi_{DIFF}$ in the lower portion of the second leg 152.

It is further noted in FIGS. 2 and 4 that the choke 130 provides for opposite (counterclockwise) common mode flux $\Phi_{CM}/2$ with respect to currents flowing in the return windings LB and LD as shown in FIG. 4, and clockwise common mode flux $\Phi_{CM}/2$ with respect to currents flowing in the coil windings LA and LC.

In certain embodiments, the number of turns in each of the windings LA, LB, LC and LD are the same, and the first and second legs 151 and 152 of the core structure 150 are generally of the same size, shape, and material, whereby the inductances L associated with these windings LB-LD are generally equal. In other embodiments, one or more of these design parameters may be varied for individual ones of the windings LA, LB, LC and/or LD whereby the coils L associated with the individual windings LA-LD may be different. Moreover, the interconnection of the windings LA-LD within a given power conversion system 100 may be adjusted along with design parameters related to the DC link choke 130 itself in order to provide a variety of different combinations of inductance with respect to common mode voltages, differential mode currents, etc.

As noted above, the rectifiers 110 may be active front end (AFE) switching rectifiers, with the controller 140 providing a first set of rectifier switching control signals 112-1 to the switching devices Sap1, San1, Sbp1, Sbn1, Scp1 and Scn1 of the first rectifier 110-1 and a second set of rectifier switching control signals 112-2 to the switching devices Sap2, San2, Sbp2, Sbn2, Scp2 and Scn2 of the second rectifier 110-2. In addition, the controller 140 in certain embodiments may provide the second set of rectifier switching control signals 112-2 synchronized with the first set of rectifier switching control signals 112-1. In certain embodiments, moreover, the controller 140 provides the second set of rectifier switching control signals 112-2 phase shifted with respect to the first set of rectifier switching control signals 112-1 and the phase shifting can be done in the controller 140 so as to control low order harmonics. Thus, the use of at least one shared common mode choke 130 facilitates cost, size and weight reduction in combination with the ability to provide common mode stress reduction without requiring input or output transformers, and allows the use of selective harmonic elimination (SHE) rectifier control to allow elimination of, or reduction in the size of, input filter components in the drive 100.

Figure 5:
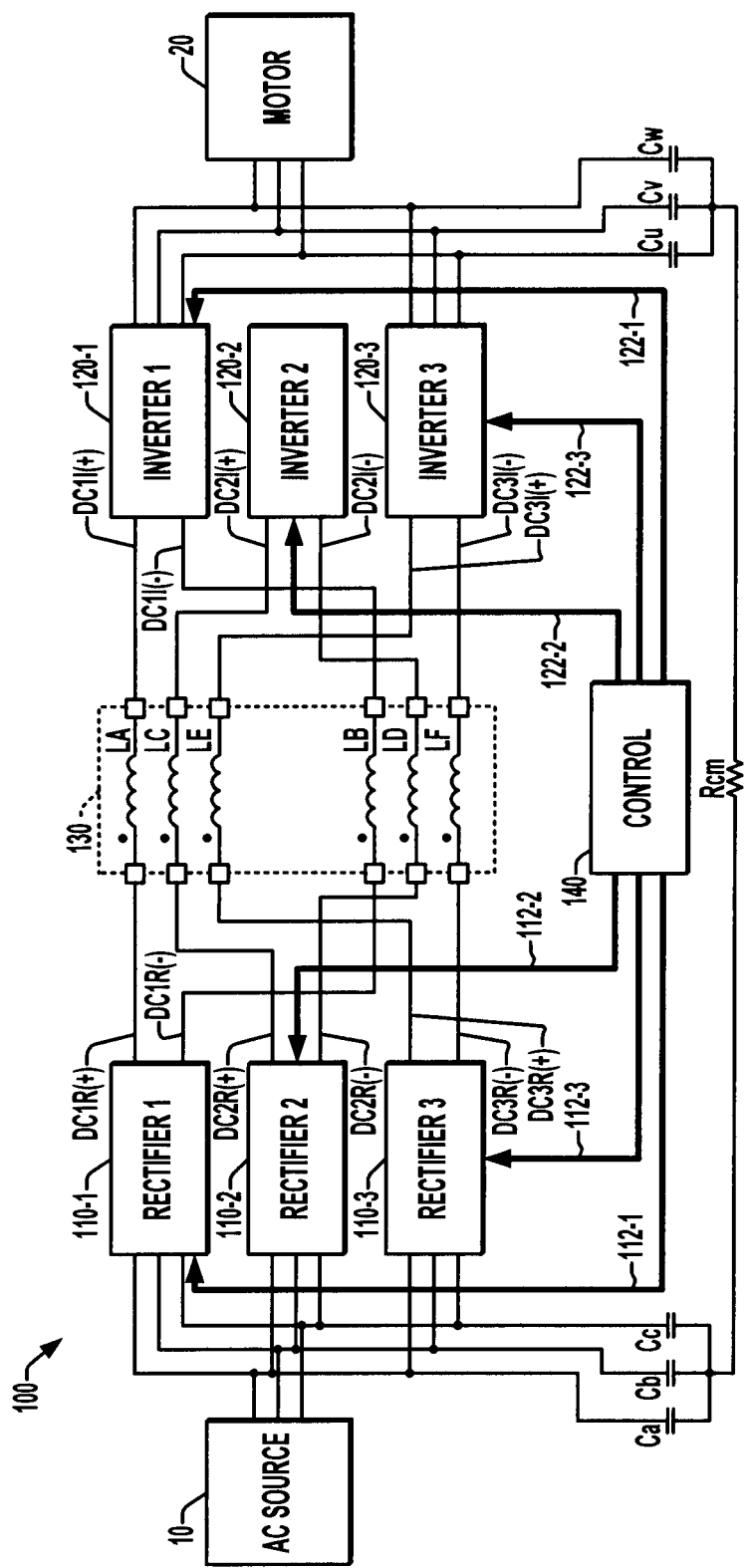
FIG. 5 is a schematic diagram illustrating an exemplary parallel motor drive with three rectifiers coupled with three corresponding inverters using a single DC link choke in accordance with the present disclosure.

Referring now to FIGS. 5 and 6, another exemplary motor drive embodiment 100 is illustrated having three rectifiers 110-1, 110-2 and 110-3, as well as three corresponding inverter's 120-1, 120-2 and 120-3, respectively. The positive DC output of the first rectifier 110-1 is coupled through a coil LA of a shared common mode choke 130 to the positive input of the first inverter 120-1, and the negative rectifier output is connected to the negative inverter input via a coil LB of the choke 130. Similarly, the DC output of the second rectifier 110-2 is coupled to the DC input of the second inverter 120-2 via choke coils LC and LD, and the output of the third rectifier 110-3 is coupled with the input of the third inverter 120-3 via choke coils LE and LF.

FIG. 6 illustrates an exemplary winding configuration for the winding coils LA-LF in one embodiment. In this example, the choke windings LA, LB and LC associated with the positive DC links of the respective rectifier/inverter pairs are wound around the first choke leg 151 and the windings LD, LE and LF associated with the negative DC links are wound around the second leg 152 across from the corresponding positive DC link windings LA, LB and LC, respectively as shown. In addition, the choke 130 includes a generally rectangular core structure 150 with first and second shunts 160 disposed between the core legs 151 and 152 between the vertical extents of adjacent coil pairs as shown. In practice, the illustrated choke embodiment 130 of FIG. 6 facilitates adjustment of leakage inductance for each individual winding.

As noted above, further embodiments are possible in which any integer number N rectifier/inverter pairs are used with the rectifier inputs coupled together and with the inverter outputs coupled together, where N≥2. Moreover, as discussed above, the rectifier/inverter pairs may be coupled using at least one coil of a shared common mode choke 130 and the corresponding DC links of these rectifier/inverter pairs may be separate from one another, or some may be connected together.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. A power conversion system, comprising:
   first and second rectifiers individually comprising a rectifier input to receive AC electrical input power, a rectifier DC output with first and second DC output nodes, and a circuit operative to provide DC output power at the rectifier DC output, the rectifier inputs of the first and second rectifiers being coupled with one another;
   first and second inverters individually comprising an inverter DC input with first and second DC input nodes, an inverter AC output, and an inverter switching network operative to provide AC output power to a load, the inverter AC outputs of the first and second inverters being coupled with one another; and
   a single choke structure comprising: a single core structure, a first pair of coils wound around the single core structure and coupled between the rectifier DC output of the first rectifier and the inverter DC input of the first inverter, and a second pair of coils wound around the single core structure and coupled between the rectifier DC output of the second rectifier and the inverter DC input of the second inverter, the first and second pairs of coils being mutually coupled to one another via the single core structure to control common mode voltages.

2. The power conversion system of claim 1:
wherein the first pair of coils includes:
a first coil coupled between the first DC output node of the first rectifier and the first DC input node of the first inverter, and
a second coil coupled between the second DC output node of the first rectifier and the second DC input node of the first inverter; and
wherein the second pair of coils includes:
a third coil coupled between the first DC output node of the second rectifier and the first DC input node of the second inverter, and
a fourth coil coupled between the second DC output node of the second rectifier and the second DC input node of the second inverter.

3. The power conversion system of claim 1, wherein the first and second rectifiers individually include a plurality of switching devices individually coupled between the rectifier input and one of the DC output nodes and operative according to corresponding rectifier switching control signals to provide DC output power at the rectifier DC output.

4. The power conversion system of claim 1, wherein the rectifiers, the inverters, and the single choke are located within a single housing.

5. The power conversion system of claim 1, wherein the rectifiers, the inverters, and the single choke are located within a single housing.

6. The power conversion system of claim 1, wherein the first and second rectifiers are switching rectifiers synchronized with one another.

7. The power conversion system of claim 2, wherein the first and second rectifiers individually include a plurality of switching devices individually coupled between the rectifier input and one of the DC output nodes and operative according to corresponding rectifier switching control signals to provide DC output power at the rectifier DC output.

8. The power conversion system of claim 2, wherein the rectifiers, the inverters, and the single choke are located within a single housing.

9. The power conversion system of claim 3, comprising at least one controller providing a first set of rectifier switching control signals to the switching devices of the first rectifier and a second set of rectifier switching control signals to the switching devices of the second rectifier, wherein the at least one controller provides the second set of rectifier switching control signals synchronized with the first set of rectifier switching control signals.

10. The power conversion system of claim 6, wherein the first and second rectifiers are operated according to switching control signals phase shifted with respect to one another.

11. The power conversion system of claim 7, comprising at least one controller providing a first set of rectifier switching control signals to the switching devices of the first rectifier and a second set of rectifier switching control signals to the switching devices of the second rectifier, wherein the at least one controller provides the second set of rectifier switching control signals synchronized with the first set of rectifier switching control signals.

12. The power conversion system of claim 9, wherein the at least one controller provides the second set of rectifier switching control signals phase shifted with respect to the first set of rectifier switching control signals.

13. The power conversion system of claim 11, wherein the at least one controller provides the second set of rectifier switching control signals phase shifted with respect to the first set of rectifier switching control signals.

14. A power conversion system, comprising:
first and second rectifiers individually comprising a rectifier input to receive AC electrical input power, a rectifier DC output with first and second DC output nodes, and a circuit operative to provide DC output power at the rectifier DC output, the rectifier inputs of the first and second rectifiers being coupled with one another;
first and second inverters individually comprising an inverter DC input with first and second DC input nodes, an inverter AC output, and an inverter switching network operative to provide AC output power to a load, the inverter AC outputs of the first and second inverters being coupled with one another; and
a single choke comprising:
a first pair of coils coupled between the rectifier DC output of the first rectifier and the inverter DC input of the first inverter, the first pair of coils including:
a first coil coupled between the first DC output node of the first rectifier and the first DC input node of the first inverter, and
a second coil coupled between the second DC output node of the first rectifier and the second DC input node of the first inverter, and
a second pair of coils coupled between the rectifier DC output of the second rectifier and the inverter DC input of the second inverter, the second pair of coils including:
a third coil coupled between the first DC output node of the second rectifier and the first DC input node of the second inverter, and
a fourth coil coupled between the second DC output node of the second rectifier and the second DC input node of the second inverter;
wherein the single choke comprises:
a core structure comprising: a first leg including first and second ends and an intermediate portion disposed between the first and second ends, a second leg including first and second ends and an intermediate portion disposed between the first and second ends, a third leg extending between the first ends of the first and second legs, and a fourth leg extending between the second ends of the first and second legs,
at least one shunt providing a magnetic flux path between intermediate portions of the first and second legs, the at least one shunt extending between the intermediate portions of the first and second legs, and forming a plurality of gaps between the intermediate portions of the first and second legs and the at least one shunt,
a first winding forming the first coil and forming at least one turn around the first leg between the intermediate portion and the first end of the first leg;
a second winding forming the second coil and forming at least one turn around the first leg between the intermediate portion and the second end of the first leg;
a third winding forming the third coil and forming at least one turn around the second leg between the intermediate portion and the first end of the second leg; and
a fourth winding forming the fourth coil and forming at least one turn around the second leg between the intermediate portion and the second end of the second leg.

15. The power conversion system of claim 14, wherein the first and second rectifiers individually include a plurality of switching devices individually coupled between the rectifier input and one of the DC output nodes and operative according to corresponding rectifier switching control signals to provide DC output power at the rectifier DC output.

16. The power conversion system of claim 14, wherein the rectifiers, the inverters, and the single choke are located within a single housing.

17. The power conversion system of claim 15, comprising at least one controller providing a first set of rectifier switching control signals to the switching devices of the first rectifier and a second set of rectifier switching control signals to the switching devices of the second rectifier, wherein the at least one controller provides the second set of rectifier switching control signals synchronized with the first set of rectifier switching control signals.

18. The power conversion system of claim 17, wherein the at least one controller provides the second set of rectifier switching control signals phase shifted with respect to the first set of rectifier switching control signals.

19. A parallel current source converter system, comprising:
   a plurality of current source converters, individually comprising:
      a rectifier including a rectifier input, a rectifier DC output with first and second DC output nodes, and a rectifier circuit operative to provide DC output power at the rectifier output,
      an inverter including an inverter DC input with first and second inverter DC input nodes, an inverter AC output, and an inverter switching network operative to provide AC output power for driving a load, and
      a DC link circuit including a first coil coupled between the first rectifier DC output and the first inverter DC input, and a second coil coupled between the second rectifier DC output and the second inverter DC input,
      wherein the rectifier inputs are coupled with one another, and the inverter AC outputs are coupled with one another; and
   a single choke structure comprising a single core structure and the first and second coils of the plurality of current source converters, wherein the first and second coils of the plurality of current source converters are wound around the single core structure and are mutually coupled to one another via the single core structure.

20. The system of claim 19, wherein the rectifier circuit comprises a plurality of switches operative to provide DC output power at the rectifier output.

* * * * *